United States Patent [19]
Aghajan et al.

[11] Patent Number: 5,583,956
[45] Date of Patent: *Dec. 10, 1996

[54] ESTIMATION OF SKEW ANGLE IN TEXT IMAGE

[75] Inventors: Hamid K. Aghajan; Thomas Kailath, both of Stanford, Calif.

[73] Assignee: The Board of Trustees of the Leland Stanford Junior University, Palo Alto, Calif.

[*] Notice: The term of this patent shall not extend beyond the expiration date of Pat. No. 5,418,892.

[21] Appl. No.: 259,369

[22] Filed: Jun. 14, 1994

Related U.S. Application Data

[63] Continuation of Ser. No. 3,387, Jan. 12, 1993, abandoned.

[51] Int. Cl.$^6$ ........................................... G06K 9/36
[52] U.S. Cl. ............................... 382/290; 382/296
[58] Field of Search ................................. 382/9, 61, 62, 382/46, 41, 289, 290, 296; 342/147

[56] References Cited

U.S. PATENT DOCUMENTS

| | | | |
|---|---|---|---|
| 2,688,132 | 8/1954 | Wolf | 342/147 |
| 3,069,654 | 12/1962 | Hough | 382/281 |
| 3,154,778 | 10/1964 | Kock | 342/147 |
| 3,273,144 | 9/1966 | Fishbein | 342/147 |
| 4,180,814 | 12/1979 | Barton | 342/147 |
| 4,558,461 | 12/1985 | Schlang | 382/290 |
| 4,811,047 | 3/1989 | Hosaka et al. | 355/14 E |
| 4,866,784 | 9/1989 | Barski | 382/46 |
| 5,001,766 | 3/1991 | Baird | 382/46 |
| 5,054,098 | 10/1991 | Lee | 382/46 |
| 5,093,674 | 3/1992 | Storlie | 346/108 |
| 5,101,448 | 3/1992 | Kawachiya et al. | 382/61 |
| 5,103,490 | 4/1992 | McMillin | 382/62 |
| 5,128,525 | 7/1992 | Stearns et al. | 235/454 |
| 5,418,892 | 5/1995 | Aghajan et al. | 395/118 |

*Primary Examiner*—Joseph Mancuso
*Assistant Examiner*—Jon Chang
*Attorney, Agent, or Firm*—Townsend and Townsend and Crew; Henry K. Woodward

[57] ABSTRACT

Disclosed is a fast and high resolution technique for estimating the skew angle in text document images. Detection of the skew angle is an important step in text processing tasks such as optical character reading (OCR) and computerized filing. The proposed method is based on the application of a recently developed algorithm for estimation of angle of straight lines in a scanned image. The Subspace-Based Line Detection (SLIDE) algorithm formulates the multi-line fitting problem in a special parameter estimation framework such that a signal structure similar to the one in the field of high-resolution sensor array processing is obtained. Then the well-studied techniques in that formalism (e.g., the ESPRIT algorithm) are exploited to produce closed-form and high resolution estimates for line parameters.

5 Claims, 8 Drawing Sheets

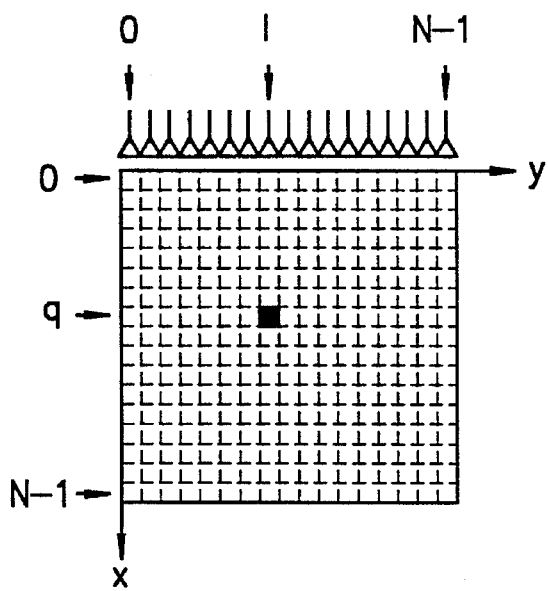 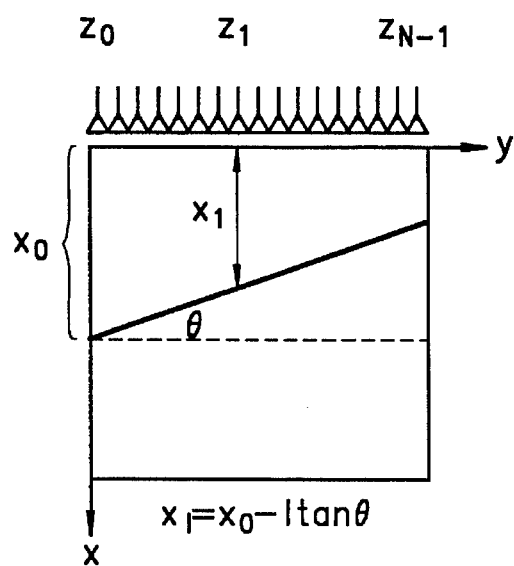
FIG. 2A  FIG. 2B
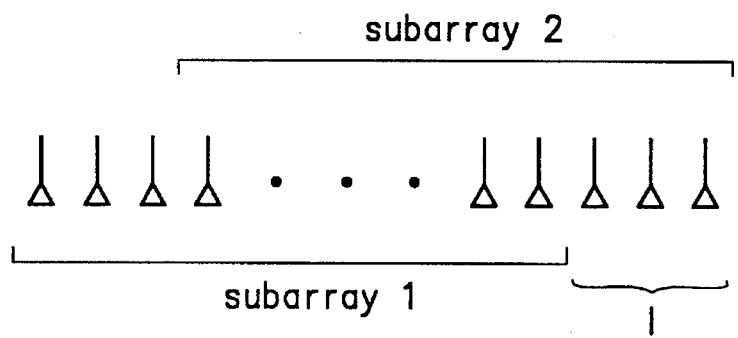
FIG. 3

FIG. 4

FIG. 7 subspace-based ...
18]. The Subspace-based Line Dete...
echnique [19, 20, 21] for estimating the parameters of mu...
e. SLIDE yields closed-form and high resolution estimates of the line
as opposed to the line fitting method of the Hough transform in which
neters are subject to limited resolution due to the chosen bin sizes and
implementing a search procedure. Moreover, the computational comple
 is an order of magnitude less than that of the Hough transform method.
does not require a large memory space, whereas the Hough transform m
. large space to store the output accumulator values.
the SLIDE algorithm, estimation of line parameters is accomplished
. First, the directions of the lines are estimated and then an estima
fsets is provided. In some text image analysis applications, such as comp
, systems, this ordering in estimating the line parameters is desirable since
ied parameter is the skew angle. In other applications, including OCR, k
ne skew angle may be used in either of the following two ways. The text
rotated back to have horizontal lines of text before proceeding to estima
seline positions (i.e. the line offsets); or the location of baselines can be
thout rotating the image. The fact that SLIDE estimates the line angles
erforming of either of the above procedures, while in using the Hough
 problems of angle and offset estimation are dealt with at the same t
 two dimensional search.
 line parameter estimation p
 present)

*FIG. 9*

ESTIMATION OF SKEW ANGLE IN TEXT IMAGE

This invention was made with Government support under contract F49620-90-C-0014 awarded by the Department of the Air Force. The Government has certain rights in this invention.

This is a continuation of application Ser. No. 08/003,387, filed Jan. 12, 1993, now abandoned.

ESTIMATION OF SKEW ANGLE IN TEXT IMAGE

The invention relates generally to text processing such as optical character reading, and more particularly the invention relates to the estimation of skew angle in a text image.

BACKGROUND OF THE INVENTION

In applications of document analysis, printed pages of documents are scanned and represented by two dimensional images for further processing. One such application area is storing and retrieving of document pages by computer filing systems. Another major application area is optical character recognition (OCR) in which the characters in a text document are recognized by computer and the text is converted into a string of characters. In both these applications, the relative inclination angle of the page being scanned needs to be detected and accounted for. Uncompensated skew can cause serious performance deterioration in both mentioned application areas. In computerized filing systems, it makes the concatenation or superposition of two parts of the stored data a prohibitive task. In OCR, locating characters on different lines becomes very difficult if the line bases are not horizontal.

In a general document image analysis procedure, the first step is to segment the image into different regions including only text or graphics. In the subsequent stage of analyzing the text blocks, the skew angle has to be determined before proceeding to next steps.

Several methods have been developed for estimating the skew angle of text lines in a document page. In the early work, least squares minimization was used to fit a straight line to characters in a line of text. More recently, the Hough transform has been proposed to be used for detecting the skew angle and positions of the lines of text. The Hough transform is a special case of the Radon transform, the latter being essentially a mapping from the coordinate space to the space of parameters that define projections of the coordinate space. The Hough transform was originally developed for estimating the parameters of straight lines in an image, and was later extended to handle other shapes. In the line detection application of the Hough transform, each significant pixel in the image is mapped to a curve in the parameter space and elements of an accumulator array are incremented at locations through which the curve passes. The line parameters are $\rho$, the normal distance of the line from the origin, and $\theta$, the angle that the normal to the line makes with positive x axis. $\rho$ and $\theta$ define the parameter space and an accumulator array is constructed by bounding and discretizing them in their predicted possible ranges. Each pixel in the image is mapped by the Hough transform to the curve $$\rho = x \cos \theta + y \sin \theta \quad (1)$$

in the $\rho$-$\theta$ plane. This equation also represents the line in the x-y plane that has a distance $\rho$ to the origin and the normal to it makes an angle $\theta$ with the x axis. Therefore, all the points in the x-y plane located on the line $\rho_o = x \cos \theta_o + y \sin \theta_o$ are mapped to curves in the $\rho$-$\theta$ plane that all pass through the point $(\rho_o, \theta_o)$. After mapping all the points in the image, a search procedure is needed to be performed in the $\rho$-$\theta$ plane to find peak locations, which are assumed to correspond to the line parameters. The Hough transform method is capable of handling a fairly high amount of noise contamination; however, it is computationally expensive and also requires a search stage. Moreover, the choice of the quantization step for the $\rho$ and $\theta$ axes is dependent on the unknown parameters and is not straightforward; to obtain an acceptable resolution in the estimates, the $\rho$ and $\theta$ axes need to be quantized finely, but reducing the quantization steps will broaden the peaks in the transform plane. This is because the points on a line are not exactly collinear in a discretized image, and hence the curves corresponding to a line do not exactly pass through the same point. Some procedures have been investigated to compensate for this difficulty in the quantization step of the Hough transform, but the computational complexity of the method inhibits its real-time implementation in most practical applications.

In the area of skew angle detection for text document analysis, several approaches have been proposed that are based on different modifications of the Hough transform. One approach is that of treating the text as thick lines and choosing a coarse quantization for $\rho$ to overcome the broadening effect mentioned above. However, since the font sizes are not known a priori, the choice of an appropriate quantization step is made iteratively, resulting in a dramatic computation cost increase. Another approach adopts a variable step size for $\rho$ that is a function of $\theta$ in order to overcome the so-called aliasing problem caused by the nonuniform number of parallel line pixels among different angle bins. Then, after computing the transform, they consider the rate of change in accumulator elements along each angle and choose the angle with the highest overall gradient as the skew angle of the text. Although this method does not require knowledge of font size, the high computational load of the Hough transform still makes it is quite slow.

Another approach applies the Hough transform to the corners of the rectangles obtained by connecting near black pixels in the document, and then apply several sharpness criteria in the transform domain to locate the angle that best corresponds to the text skew. To reduce the computational cost of the Hough transform, one can first create a so-called burst image from the document image by accumulating the intensities of each set of pixels that are connected to each other vertically, and associating the resulting number with the pixel location at the bottom of the set; the intensities of the rest of the pixels are set to zero. Then the Hough transform is applied to the resulting burst image in order to find the skew angle. This run-length encoding procedure helps to reduce the number of nonzero pixels in the image; however, this procedure rapidly degrades as the skew angle of the text increases, since most characters will not contain vertically connected pixels when rotated.

SUMMARY OF THE INVENTION

The method in accordance with the invention is based on reformulating the line fitting problem into a subspace-based high-resolution spectral estimation framework. The Subspace-based Line Detection (SLIDE) algorithm is a recently developed technique for estimating the parameters of multiple straight lines in an image. See our papers entitled, "A Subspace Fitting Approach to Super Resolution Multi-Line Fitting and Straight Edge Detection", In *Proc. of IEEE ICASSP III*:121–124, 1992 and "Sensor Array Processing Techniques for Super Resolution Multi-Line Fitting and Straight Edge Detection", *IEEE Trans on Image Processing*, 1993. SLIDE yields closed-form and high resolution estimates of the line parameters, as opposed to the line fitting method of the Hough transform in which the line parameters are subject to limited resolution due to the chosen bin sizes and are found by implementing a search procedure. Moreover, the computational complexity of SLIDE is an order of magnitude less than that of the Hough transform method. Also SLIDE does not require a large memory space, whereas the Hough transform method needs a large space to store the output accumulator values.

In the SLIDE algorithm, estimation of line parameters is accomplished in two phases. First, the directions of the lines are estimated and then an estimation of the offsets is provided. In some text image analysis applications, such as computerized filing systems, this ordering in estimating the line parameters is desirable since the only needed parameter is the skew angle. In other applications, including OCR, knowledge of the skew angle may be used in either of the following two ways. The text image can be rotated back to have horizontal lines of text before proceeding to estimation of the baseline positions (i.e., the line offsets); or the location of baselines can be estimated without rotating the image. The fact that SLIDE estimates the line angles first allows performing of either of the above procedures, while in using the Hough transform, the problems of angle and offset estimation are dealt with at the same time and this essentially results in a two dimensional search.

The SLIDE algorithm reformulates the line parameter estimation problem into a subspace fitting framework by applying a propagation (phase-preserving projection) scheme on the image pixels. By doing so, SLIDE introduces a perfect mathematical analogy between the problem of estimating angles of multiple lines in an image and the problem of determining the directions of arrival of planar electromagnetic waves impinging on an antenna array. The problem of direction-of-arrival estimation has been extensively studied, e.g., for radar and sonar applications, and in particular, in the last decade several so called super-resolution algorithms have been developed. In the line fitting problem, it is shown that the conditions for using a certain computationally efficient (ESPRIT) algorithm from sensor array processing are met. The mentioned analogy is made by adopting a signal generation scenario from the image pixels that is called the constant-µ propagation for reasons that become clear shortly. SLIDE does not require a search procedure and its computation load is an order of magnitude less than that of the Hough transform.

The invention will be more fully understood with reference to the following detailed description and appended claims when taken with the drawings.

BRIEF DESCRIPTION OF THE DRAWINGS

FIG. 2A illustrates an image matrix and the hypothetical sensors located along the horizontal axis; and FIG. 2B illustrates measurements obtained from a single straight line.

FIG. 3 illustrates an overlapped subarray configuration in a uniform linear array with the subarray separation A being equal to 1 times the element spacing.

FIG. 4 illustrates an original text image.

FIG. 7 illustrates an original text image with the skew angle estimated by SLIDE shown at the bottom.

FIG. 9 illustrates the text image skew-corrected using the estimated angle.

DETAILED DESCRIPTION OF ILLUSTRATIVE EMBODIMENTS

Initially, we will outline the main features of SLIDE. Since we are mainly concerned with estimation of the skew angle in text documents, here only the angle estimation stage of SLIDE will be presented. More detailed derivation and discussion on offset estimation stage of SLIDE can be found in our papers referenced above. As mentioned earlier, since the estimation of the angle of the lines is performed independent from the offset estimation, the detected angle can be used either to rotate the text image back or to estimate the baseline locations, depending on the particular application.

In what follows, the SLIDE algorithm is introduced as a technique for estimating parameters of multiple straight lines in an image that may have different angles. In the text image analysis, the lines of text are normally parallel to each other and hence the number of angles is known to be one. It is also worth mentioning that the algorithm is naturally devised for being applied to images in which the line pixels have greater values than the background. This includes both binarized images with '1's for lines and '0's for background, and edge-enhanced grey scale images.

Estimation of Line Angles

Figure 1:
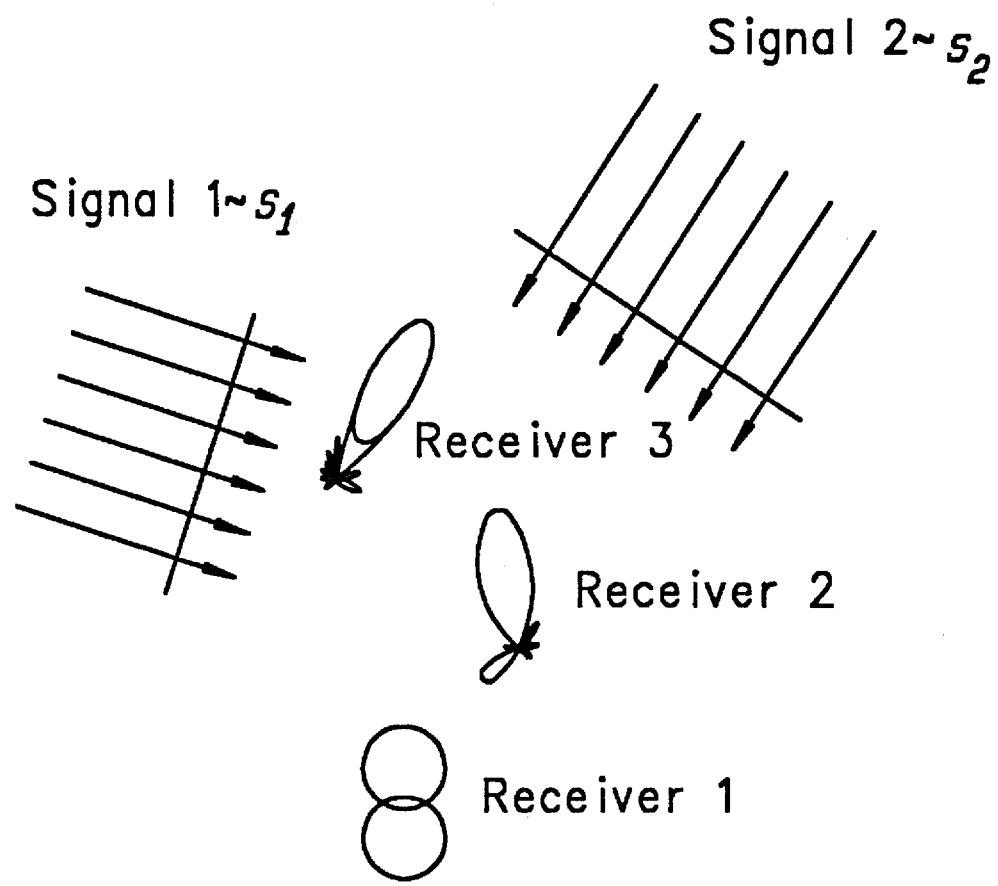
FIG. 1 illustrates a passive sensor array geometry.

SLIDE reformulates the multiple line angle estimation into the framework of sensor array processing by the virtue of introducing a propagation scenario for the image under consideration. In the so-called constant-µ propagation scenario, each pixel of the image in a row (column) contributes to a received signal at a hypothetical sensor located in front of the corresponding row (column) of the image matrix. This contribution is in effect equivalent to a phase delay if the pixel is regarded to be a source of electromagnetic wave. More formally, let's assume that all pixels in the image start to propagate narrow band electromagnetic waves with zero initial phase. Furthermore, assume that the waves emanated from pixels in a given column of the image matrix are confined to travel only along that column towards the corresponding sensor. In this propagation environment, each straight line in the image will be in effect equivalent to a wavefront of a travelling planar wave, because the waves of pixels on a line retain constant relative phase along paths parallel to that line. As we shall see later, this propagation scenario creates measurements at the sensors similar to the measurements obtained in real antenna array processing. FIG. 1 shows a simple antenna array geometry in which two sources and three sensors are involved and sensors have an arbitrary position relative to each other. Certain data structures can be achieved by using a uniform linear array of sensors.

We assume that a uniform linear array of sensors is located along the horizontal axis of the image matrix, each sensor receiving signals only from its corresponding column in the matrix according to the following rule (FIG. 2A). If there are p nonzero pixels on the l-th column of the image matrix located on rows $q_1, \ldots, q_p$ respectively, then the sensor in front of the l-th column will receive the signal $$z_l = \sum_{i=1}^{p} e^{-j\mu q_i} \qquad (2)$$

where $\mu$ is a constant parameter to be chosen at our convenience. Now assume that there is one straight line in an L×N image with offset $x_O$ and angle $\theta$, as in FIG. 2B. Provided that the line width is such that the line gives rise to only one nonzero pixel per column, and that there are no noise pixels, the measured signal at the l-th receiver will be $$z_l = e^{-j\mu x_0} \cdot e^{j\mu l \tan \theta} \qquad (3)$$

In a more general case, where there are d straight lines and also noise pixels in the image, the signal will be $$z_l = \sum_{k=1}^{d} e^{j\mu l \tan \theta_k} \cdot e^{-j\mu x_{0k}} + n_l \qquad (4)$$

where $n_l$ includes the effect of noise in the l-th column, which may consist of individual noise pixels and also takes care of possible displacement or removal of a line pixel in that column.

Now let us define $$a_l(\theta_k) = e^{j\mu l \tan \theta_k}, \quad s_k = e^{j\mu x_{0k}} \qquad (5)$$

so that $$z_l = \sum_{k=1}^{d} a_l(\theta_k) s_k + n_l, \qquad l = 0, \ldots, N-1 \qquad (6)$$

We will call this signal generation scenario the constant-$\mu$ propagation. This scenario is effectively encoding the line angles as frequencies of cisoidal components in the measurement vector $z=[z_O, \ldots, z_{N-1}]^T$.

As Eq. (4) shows, the measurement vector z includes d cisoidal components contaminated with noise. Any spectral estimation technique (including FFT) can be applied in this stage to extract the frequencies of the cisoids. However, since high resolution estimates of the angles are desired, we pursue with exploiting the subspace-based techniques of array processing framework.

Using a window of length M, we can arrange the measurements in a matrix form as $$Z_p = [z_1, \ldots, z_p] = \begin{bmatrix} z_0 & z_1 & \ldots & z_{N-M} \\ z_1 & z_2 & \ldots & z_{N-M+1} \\ \cdot & \cdot & & \cdot \\ \cdot & \cdot & & \cdot \\ \cdot & \cdot & & \cdot \\ z_{M-1} & z_M & \ldots & z_{N-1} \end{bmatrix} \qquad (7)$$

where P=N+1−M and the new snapshot vector $z_p \in C^{M \times 1}$ can be written as $$z_p = A(\theta) s_p + n_p \qquad (8)$$

In the above, $A(\theta) = [a(\theta_1), \ldots, a(\theta_d)]$ is an M×d matrix with k-th column $a(\theta_k) = [1, \lambda_k, \ldots, \lambda_k^{M-1}]^T$ with $\lambda_k = e^{j\mu \tan \theta_k}$. This rearrangement of the data is called spatial smoothing.

Combining Eqs. (6), (7), we can write $$Z_p = A(\theta) S_p + N_p \qquad (9)$$

where, $$S_p = [s_1, \ldots, s_p] = [I, \Phi, \ldots, \Phi^{N-M}]s \qquad (10)$$

$$N_p = [n_1, \ldots, n_p] = \begin{bmatrix} n_0 & n_1 & \ldots & n_{N-M} \\ n_1 & n_2 & \ldots & n_{N-M+1} \\ \cdot & \cdot & & \cdot \\ \cdot & \cdot & & \cdot \\ \cdot & \cdot & & \cdot \\ n_{M-1} & n_M & \ldots & n_{N-1} \end{bmatrix} \qquad (11)$$

and where $s=[e^{-j\mu x_{01}}, \ldots, e^{-j\mu x_{0d}}]^T$ contains the offsets of the lines, and $\Phi = \text{diag}[\lambda_1, \ldots, \lambda_d]$.

Now we are ready to apply the well-studied array processing techniques to the multi-line angle estimation problem. In sensor array processing framework, the goal is to estimate the directions of arrival $\theta$ of d impinging planar wavefronts on the array of M sensors, given P snapshots $z_i$, i=1, ..., P. There are many algorithms for this problem, but for the present application a particular one called TLS-ESPRIT appears to be the most appropriate.

In the ideal case of P→∞, the covariance matrix of the measurements has the following structure $$R_{zz} = \lim_{P \to \infty} \frac{1}{P} \sum_{p=1}^{P} z_p z_p^* = A(\theta) R_{ss} A^*(\theta) + \sigma^2 I \qquad (12)$$

where $$R_{ss} = \lim_{P \to \infty} \frac{1}{P} \sum_{p=1}^{P} s_p s_p^* \qquad (13)$$

and it is assumed that $$\lim_{P \to \infty} \frac{1}{P} \sum_{p=1}^{P} n_p n_p^* = \sigma^2 I \qquad (14)$$

Now let the eigendecomposition of $R_{zz}$ be $$R_{zz} = \sum_{i=1}^{M} \lambda_i e_i e_i^* = E_s \Lambda_s E_s^* + E_n \Lambda_n E_n^* \qquad (15)$$

where $\lambda_1 \geq \lambda_2 \geq \ldots \geq \lambda_M$. The Matrix $E_s$ contains the d eigenvectors of $R_{zz}$ corresponding to its largest d eigenvalues, i.e., $E_s = [e_1, \ldots, e_d]$. The range space of $E_s$ is called signal subspace. Its orthogonal complement is called the noise subspace and is spanned by the columns of $E_n = [e_{d+1}, \ldots, e_M]$. It is easily seen from Eq. (12) that the smallest eigenvalue of $R_{zz}$ has multiplicity M−d and is equal to the noise variance. Thus, $\Lambda_n = \sigma^2 I$. Moreover, it can be seen that the signal subspace is equal to span $\{A(\theta_O)\}$, i.e., span $\{E_s\}$=span $\{A(\theta_O)\}$, thus explaining the name. This is the basic observation in all subspace-based array processing techniques, including ESPRIT.

In practice, only the sample covariance matrix $\hat{R}_{zzp}$ is available, and its eigendecomposition is $$\hat{R}_{zzp} = \frac{1}{P} Z_p Z_p^* = \hat{E}_s \hat{\Lambda}_s \hat{E}_s^* = \hat{E}_n \hat{\Lambda}_n \hat{E}_n^* \qquad (16)$$

where now $\Lambda_n \neq \sigma^2 I$, except asymptotically as P→∞.

Determining the value of d is crucial here because by knowing d we can identify the eigenvectors corresponding to the d largest eigenvalues of $\hat{R}_{zz}$ as a basis for the estimate of the signal subspace. In text document images, the lines of text are generally parallel to each other and hence the value of d is known a priori to be one. In general, the value of d can be estimated by detection methods of sensor array processing.

Now define $\hat{E}_1$ as the submatrix of $\hat{E}_s$ formed by rows 1 to M−1, and $\hat{E}_2$ as the submatrix of rows 2 to M. This is a special case of partitioning the receiver array into two maximally overlapping subarrays with a displacement $\Delta$; here we have chosen $\Delta=1$ (see FIG. 3). We next form the eigendecomposition of the 2d×2d matrix $$\begin{bmatrix} \hat{E}_1^* \\ \hat{E}_2^* \end{bmatrix} [\hat{E}_1 \ \hat{E}_2] = F\Lambda F^*. \quad (17)$$

Partition F into d×d submatrices, $$F = \begin{bmatrix} F_{11} & F_{12} \\ F_{21} & F_{22} \end{bmatrix} \quad (18)$$

and then let $$\lambda_k = \text{the eigenvalues of } -F_{12}F_{22}^{-1} \quad (19)$$

Finally, the line angles are obtained as $$\hat{\theta}_k = \tan^{-1}\left[\frac{c}{\omega\Delta} \ Im\left(\ln\frac{\lambda_k}{|\lambda_k|}\right)\right] \quad (20)$$

Generalization of the above algorithm to straight line detection in edge-enhanced grey-scale images is straightforward. It is enough to associate the grey value of the pixels to the amplitude of their propagating waves. For example, a pixel on row $\mu$ with grey value $\alpha$ contributes to the measurement of its corresponding sensor by $\alpha e^{-h\mu u}$.

Skew Detection by SLIDE

Choice of the Value of $\mu$. The estimate of the skew angle in Sec. 3.1 was obtained via the relation $$\hat{\theta}_k = \tan^{-1}\left[\frac{1}{\mu\Delta} \ Im\left(\ln\frac{\lambda_k}{|\lambda_k|}\right)\right] \quad (21)$$

where $\Delta$ is the displacement between the two subarrays used in the ESPRIT algorithm. In the above equation, normalization is done in order to compensate for possible perturbations in magnitude of $\lambda_k = e^{j\mu\Delta\tan\theta_k}$ from unity. The range of non-ambiguous angles is determined by the following formula $$-\pi < \mu\Delta\tan\theta_k < \pi \Rightarrow |\theta_k| \leq \tan^{-1}\left(\frac{\pi}{\mu\Delta}\right) \quad (22)$$

Values of $\mu$ and $\Delta$ can be chosen appropriately in order to avoid the ambiguity problem. It is also worth mentioning that since the value of $\mu$ is not dictated by the physics as it is the case in sensor array processing, improved resolution can be achieved by increasing its value. To be more specific, from Eq. (22) we must choose $$|\mu| \leq \frac{\pi}{\Delta \tan\theta_k}, \text{ all } k \quad (23)$$

in order to avoid ambiguity. In practice however, due to the fact that the image is in fact discretized (sampled), the value of $\mu$ cannot be chosen higher than $\pi$. For angle estimation, $\mu$ is better to be chosen to have a value around unity to provide both non-ambiguity and good resolution.

The following procedure yields a practical value for $\mu$ in skew angle detection application. If there are approximately n text lines in the image equidistanced from each other by $\delta$ pixels, i.e., $n=N/\delta$, choose an initial range for $\mu$ around unity from $1-\pi n/N$ to $1+\pi n/N$, and compute the measurement vector for a few values of $\mu$ in this range. Then, calculate the FFT of each measurement vector and choose the one that has the highest maximum amplitude. The corresponding value of $\mu$ is the best value among the tested values, and is nearly optimal.

Choice of Window Size. In the procedure of windowing the long N×1 measurement vector z to produce the matrix $Z_p$, the values of P and M need to be chosen such that P plays the role of number of snapshots and M is the dimension of the snapshots. In most practical cases, a value of M around $\sqrt{N}$ gives the best performance. More details can be found in "Sensor Array Processing Techniques for Super Resolution Multi-Line Fitting and Straight Edge Detection", *IEEE Trans. on Image Processing*, 1993.

Computational Complexity of SLIDE vs The Hough Transform

In order to compare the computational effort needed in SLIDE with that of the Hough transform method, two cases are considered here. In the first case, it is assumed that the image is binarized and that there is one pixel in each column of the N×N image matrix for every one of the d lines. Without the presence of any outliers, the computational effort needed for applying the Hough transformation to all pixels will be of $\mathcal{O}(N^2 d)$ provided that we choose to discretize the $\theta$ axis to N bins; in text analysis applications, we may have prior information about the possible range of the skew angle, and discretize only that range into N bins. In addition to the above, a search procedure is needed for estimating the location of peaks in the transform plane. On the other hand, SLIDE needs $\mathcal{O}(Nd)$ calculations for the propagations and $\mathcal{O}(NM^2)$ for the complete eigendecomposition of the sample covariance matrix. However, if the structure of the data matrix is exploited and also only the signal subspace of the sample covariance matrix is extracted as in the method of Xu and Kailath [G Xu and T. Kailath, "A Fast Algorithm for Signal Subspace Decomposition and Its Performance Analysis", in *Proc. of IEEE ICASSP*, pages 3069–3072, 1991] (note that this subspace contains all needed information for estimating the parameters), then the total computation load of SLIDE will be further decreased to $\mathcal{O}(N(M+2d))$. In practice, the value of M is chosen around $\sqrt{N}$, so the computational complexity of SLIDE in this case is $\mathcal{O}(N^{3/2})$ compared to $\mathcal{O}(N^2 d)$ for the Hough transform method. In the second case, it is assumed that all the $N^2$ pixels in the image participate in the computations (e.g., we have a grey-scale image). In this case, the Hough transform method requires $\mathcal{O}(N^3)$ calculations plus search. The computational effort for SLIDE in this case will be $\mathcal{O}(N^2)$ for the propagations and again $\mathcal{O}(M+d)$ for the rest of the calculations. So the computational complexity of SLIDE in this case is $\mathcal{O}(N^2)$ as compared to $\mathcal{O}(N^3)$ for the Hough transform method. This reduction in computational complexity could allow real-time implementation of SLIDE.

Summary of The Algorithm

Now an outline of the SLIDE algorithm as applied for estimating the skew angle (and also the offsets of baselines) in text document images is presented. Again, the image size is assumed to be N×N.

Choose a near optimal value for the parameter $\mu$ following the guidelines above.

Perform the constant-$\mu$ propagation as discussed above on the image and obtain the measurement vector z.

In this stage, any spectral estimation method can be applied to estimate the cisoidal components of z. However, in order to obtain high resolution and closed-form estimates, use subspace-based techniques of array processing as follows.

Rearrange the measurement vector using Eq. (7) such that P snapshot vectors of size M are produced. Use the guidelines above to choose the values of P and M.

Compute the sample covariance matrix of the snapshots as in Eq. (16); and perform its eigendecomposition. By applying the MDL method, the number of present angles can be estimated. (In general, there is only one line angle present in a text image.)

Estimate the angle by any subspace-based method. An outline of how to exploit the ESPRIT algorithm is presented above. ESPRIT provides high resolution estimates without the need for a search procedure in the parameter space.

After knowing the skew angle, the offsets of the baselines can be estimated by any of the following methods. Projecting the image along the detected skew angle and searching for peaks, performing rotation on the image or appropriate shifts to the image pixels to compensate for the skew and then projecting the image horizontally, or applying the high-resolution offset estimation of the SLIDE algorithm. However, in most practical baseline detection applications, baseline locations do not need to be estimated to sub-pixel accuracy and reasonably accurate estimates are enough.

Experimental Results

Following are experimental results of applying the SLIDE algorithm to skew detection in text document images. In order to make comparisons, the method of Hough transform which is essentially a projection technique is also applied to images and the results of both approaches are presented. It is worth re-emphasizing here that the estimates provided by the SLIDE algorithm are high resolution while the Hough transform results are limited in resolution to the bin sizes chosen for the parameters. Also, SLIDE is computationally much more efficient than the Hough transform and there is no need for a search procedure in the parameter space or curve reading in its implementation.

Figure 4:
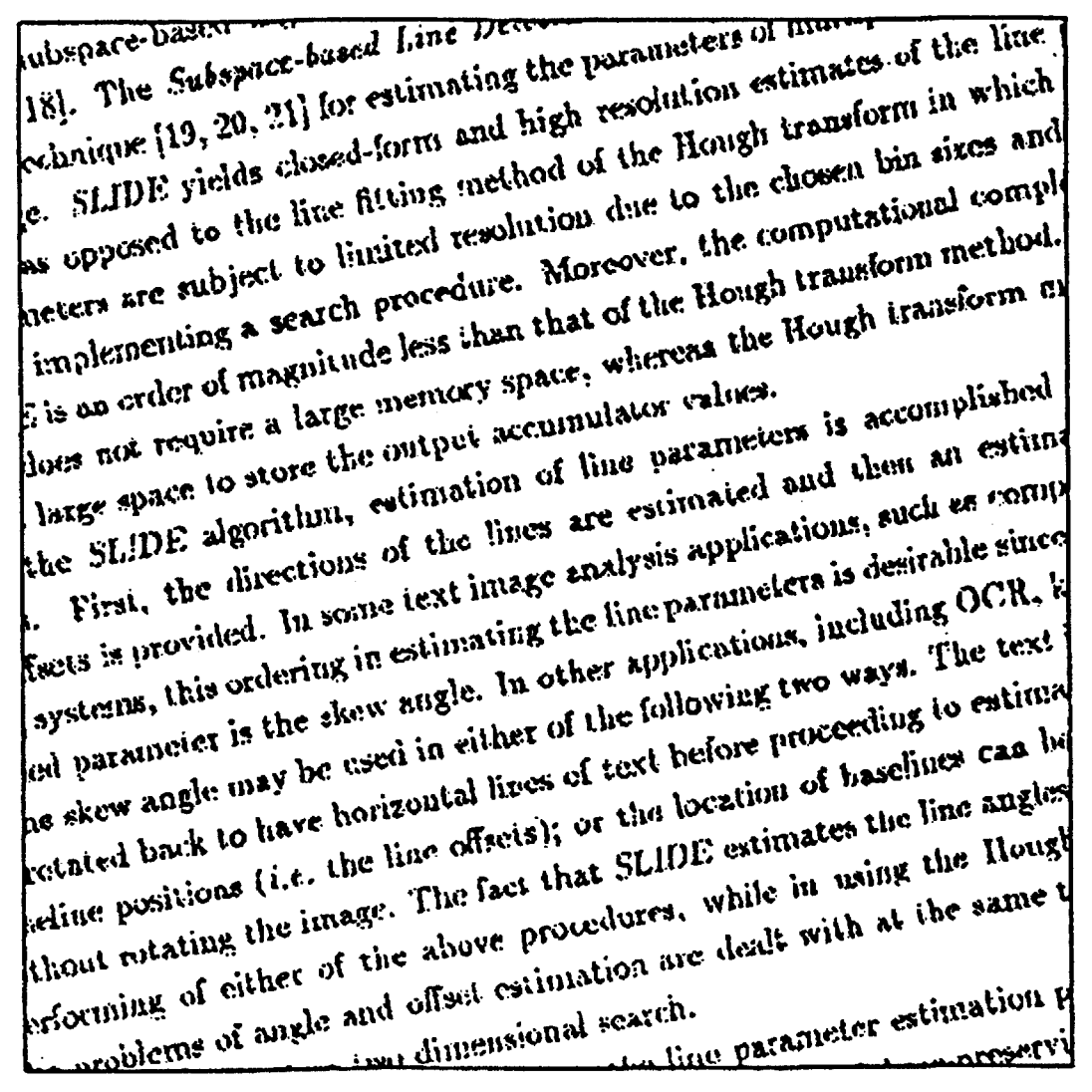

FIG. 4 shows an image of a text page scanned at 144 dpi resolution and 8 bits grey scale. The image size is 726×726 pixels. The SLIDE algorithm was applied to this image and the skew angle was estimated at 9.7648°. This value was obtained by the ESPRIT algorithm which does not need any search procedure.

Figure 5:
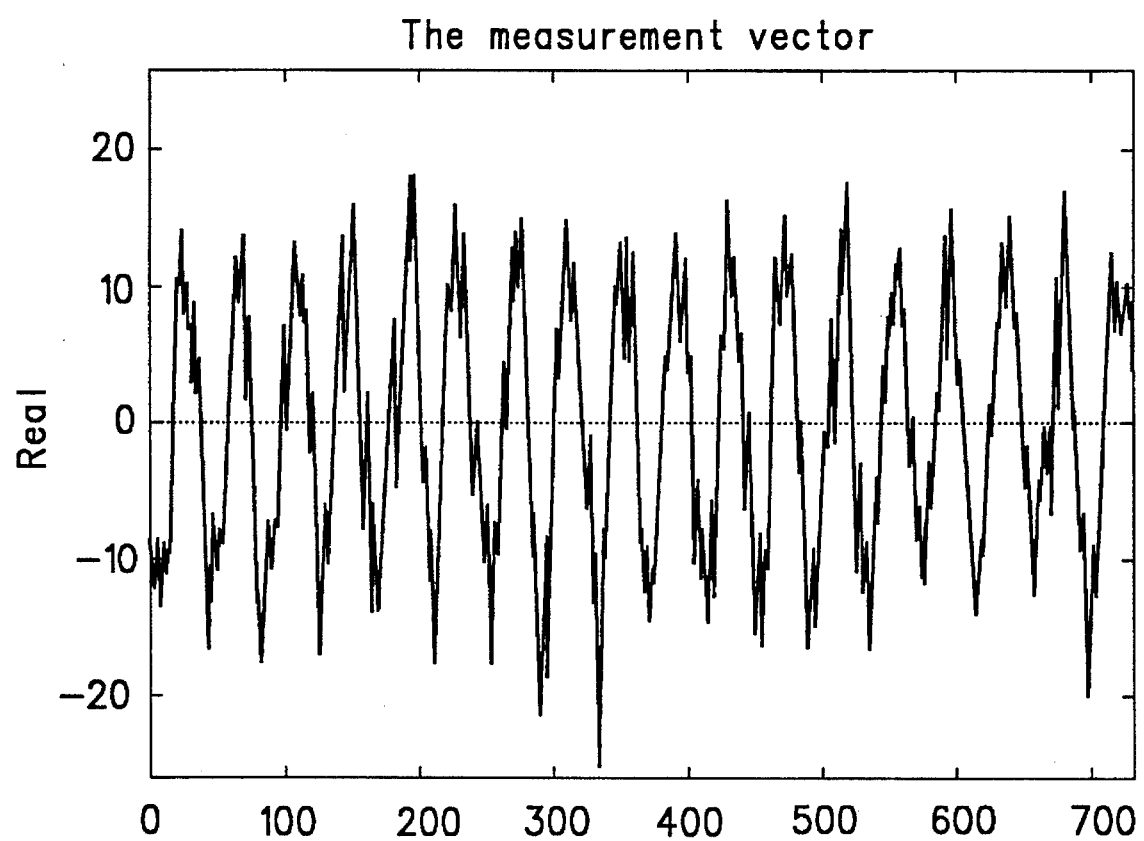
FIG. 5 illustrates a measurement vector with the frequency of the cisoid being related to the skew angle.

In FIG. 5, the measurement vector obtained by the constant-$\mu$ propagation is shown. The frequency of the cisoid is related to the skew angle.

In order to make comparison, the Hough transform was also implemented and applied to the text image.

Figure 6A:
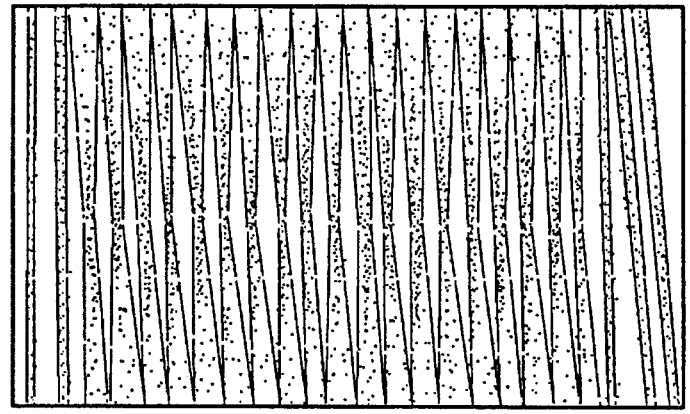
FIGS. 6A and 6B are two visualizations of a Hough transform accumulator plane for the image of FIG. 4.
Figure 6B:
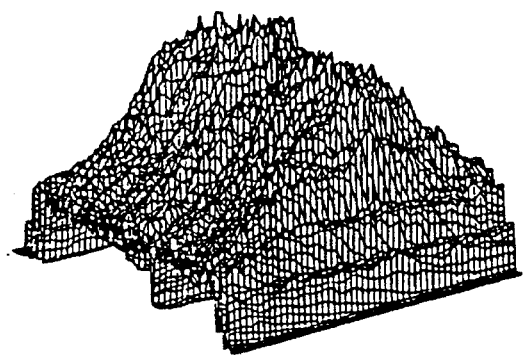
Figure 6C:
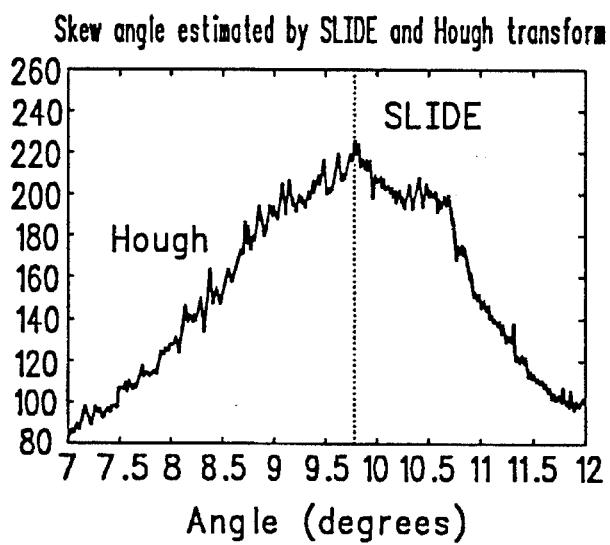
FIG. 6C shows a comparison of the skew angle detected by SLIDE and Hough transform.

For applying the Hough transform, the range of 7° to 12° was chosen for $\theta$ with step sizes of 0.01°. After transforming all the image pixels and accumulating the output plane, an average numerical value for the skew angle was obtained as follows. First, the position of the maximum on each fixed-$\rho$ line was found. Then, only the most significant maxima were retained by thresholding out the remaining points. This way, only the highest local peaks in the transform plane were used to estimate the skew angle. The mean of the positions (indices) of these points was then computed and an estimate of the skew angle was obtained at 9.75°. However, this estimate is rather sensitive to the value of the threshold chosen for picking the significant maxima as described above. The accumulator array of the Hough transform is illustrated in intensity and mesh plots in FIGS. 6A, B, respectively. FIG. 6C compares the skew angle estimated by SLIDE with the Hough transform's angle curve, the latter being a curve obtained by choosing the maximum value of the transform on each fixed-$\theta$ line, which is the method used in projection-based edge detection techniques. As this figure also suggests, the estimated skew angle by the Hough transform method is comparable with the result obtained by the SLIDE algorithm, except that the latter technique is not subject to the quantization limitations and moreover is computationally much faster.

Figure 7:
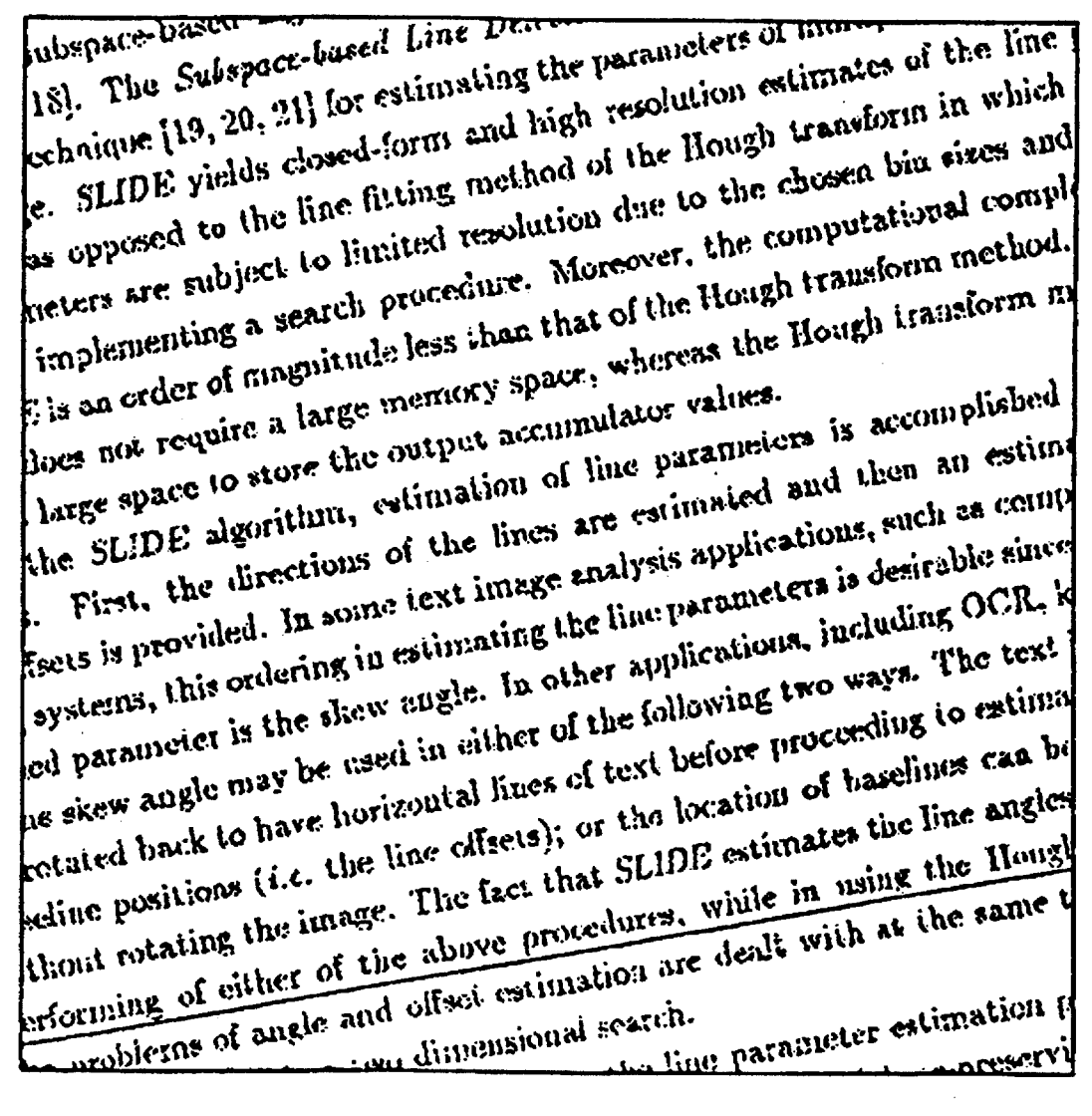

In FIG. 7, the original image is shown together with a line near the bottom of the image that has an inclination angle equal to the skew angle estimated by SLIDE.

Figure 8:
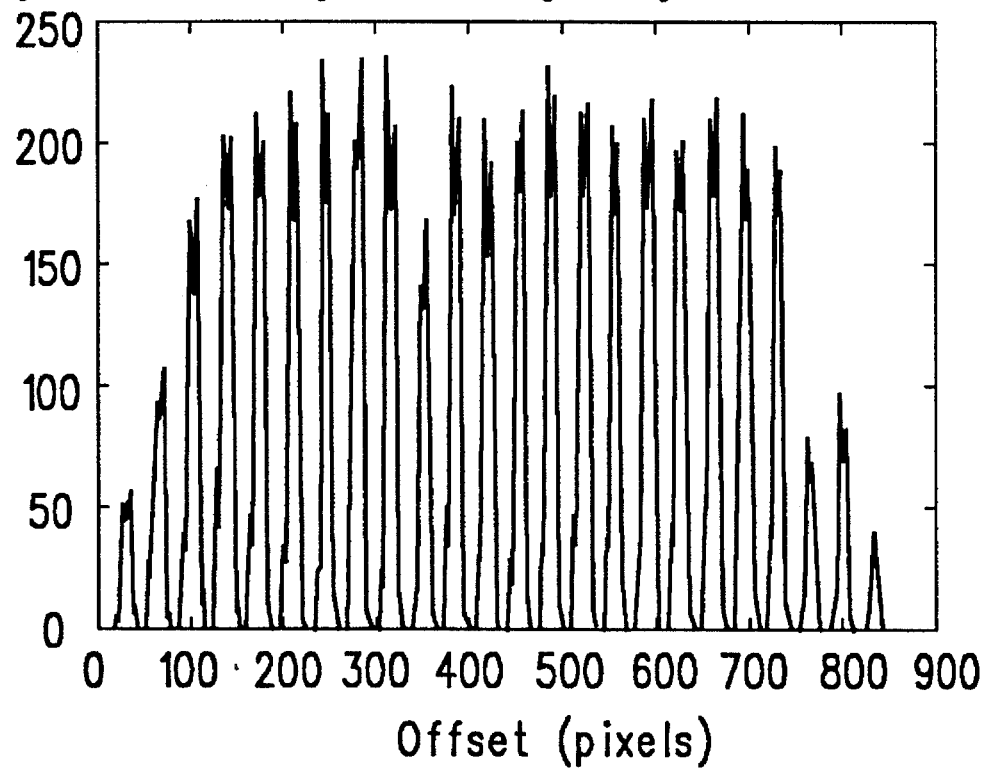
FIG. 8 illustrates a projection of the original text image along the skew angle detected by SLIDE.

The result of projecting the text image along the detected skew angle is shown in FIG. 8. Locations of the baselines are obtained from the maxima of this curve. FIG. 9 shows the text image skew-corrected using the estimated angle by SLIDE.

There has been described a new and improved method of estimating skew angles in a text image. The description is illustrative of the invention and is not to be construed as limiting the invention. Various modifications and applications may occur to those skilled in the art without departing from the true spirit and scope of the invention as defined by the appended claims.

APPENDIX A

[1] H. S. Baird, "Anatomy of a Versatile Page Reader", *Proceedings of the IEEE*, 80(7):1059–1065, July 1992.

[2] S. N. Srihari, "High-Performance Reading Machines", *Proceedings of the IEEE*, 80(7):1120–1132, July 1992.

[3] R. Casey, D. Ferguson, K. Mohiuddin, and E. Walach, "Intelligent Forms Processing System", *Machine Vision and Applications*, 5(3):143–155, 1992.

[4] S. L. Taylor, R. Fritzson, and J. A. Pastor "Extraction of Data from Preprinted Forms", *Machine Vision and Applications*, 5(3):211–222, 1992.

[5] W. K. Pratt, P. J. Capitant, W. Chen, E. R. Hamilton, and R. H. Wallis, "Combined Symbol Matching Facsimile Data Compression System", *Proceedings of the IEEE*, 68(7):1120–1132, July 1980.

[6] P. Hough, "Method and Means for Recognizing Complex Patterns", U.S. Pat. No. 3,069,654, 1962.

[7] S. R. Deans, *The Radon Transform and Some of Its Applications*, John Wiley Sons, New York, N.Y., 1983.

[8] R. O. Duda and P. E. Hart, "Use of the Hough Transform to Detect Lines and Curves in Pictures", *Communications of the ACM*, 15:11–15, 1972.

[9] D. H. Ballard, "Generalizing the Hough Transform to Detect Arbitrary Shapes", *IEEE Trans. on Pattern Analysis and Machine Intelligence*, 3(2):185–188, March 1981.

[10] W. Niblack and D. Petkovic, "On Improving the Accuracy of the Hough Transform: Theory, Simulations and Experiments", In *Proc. IEEE Conf. on Computer Vision and Pattern Recognition CVPR '88*. pages 574–579, 1988.

[11] E. R. Davies, *Machine Vision: Theory, Algorithms, Practicalities*, Academic Press, London, 1990.

[12] N. Kiryati and A. M. Bruckstein, "On Navigation Between Friends and Foes", *IEEE Trans. on Pattern Analysis and Machine Intelligence*, 13(6):602–606, 1991.

[13] S. N. Srihari and V. Govindaraju. "Analysis of Textual Images Using the Hough Transform", *Machine Vision and Applications*, 2(2):141–153, 1989.

[14] L. A. Fletcher and R. Katsuri, "A Robust Algorithm for Text String Separation from Mixed Text/Graphics Images", *IEEE Trans. on Pattern Analysis and Machine Intelligence*, 10(11):910–918, Nov. 1988.

[15] Y. Nakano, Y. Shima, H. Fujisawa, J. Higashino, and M. Fujinawa, "An Algorithm for the Skew Normalization of Document Image", In *Proc. of Int. Conf. on Pattern Recognition*, pages II:8–13, Atlantic City, N.J., 1990.

[16] S. T. Hinds, J. L. Fisher, and D. P. D'Amato, "A Document Skew Detection Method Using Run-Length Encoding and the Hough Transform", In *Proc. of Int. Conf. on Pattern Recognition*, pages I:464–468, Atlantic City, N.J., 1990.

[17] R. O. Schmidt, "Multiple Emitter Location and Signal Parameter Estimation", In *RADC Spectrum Estimation Workshop*, Griffiss AFB, N.Y., 1979.

[18] A. Paulraj, R. Roy, and T. Kailath, "Estimation of Signal Parameters by Rotational Invariance Techniques (ESPRIT)", In *Proc. of 19th Asilomar Conference on Circuits, Systems and Comp.*, 1985.

[19] R. Roy and T. Kailath, "ESPRIT: Estimation of Signal Parameters via Rotational Invariance Techniques", *IEEE Trans. on ASSP*, 37(7):984–995, July 1989.

[20] M. Viberg, B. Ottersten, and T. Kailath, "Detection and Estimation in Sensor Arrays Using Weighted Subspace Fitting", *IEEE Trans. on SP*, 39(11):2436–2449, Nov. 1991.

[21] H. K. Aghajan and T. Kailath, "A Subspace Fitting Approach to Super Resolution Multi-Line Fitting and Straight Edge Detection", In *Proc. of IEEE ICASSP*, pages III:121–124, San Fransisco, Calif., 1992.

[22] H. K. Aghajan and T. Kailath, "Sensor Array Processing Techniques for Super Resolution Multi-Line Fitting and Straight Edge Detection", *IEEE Trans. on Image Processing*, to appear, 93.

[23] H. K. Aghajan and T. Kailath, "SLIDE: Subspace-based Line Detection", In *Proc. of IEEE ICASSP*, Minneapolis, Minn., to appear, April 93.

[24] G. Xu and T. Kailath, "A Fast Algorithm for Signal Subspace Decomposition and Its Performance Analysis", In *Proc. of IEEE ICASSP*, pages 3069–3072, Toronto, Canada, 1991.

What is claimed is:

1. A method of document analysis comprising the steps of
   a) scanning text on a printed page of a document,
   b) formulating a parameter estimation text image framework for said printed page as scanned,
   c) performing a constant-$\mu$ propagation on said text image framework to obtain a measurement vector Z,
   d) estimating a skew angle using a cisoidal component of Z corresponding to said skew angle,
   e) estimating offsets of lines of scanned text using said skew angle,
   f) rotating scanned text using said skew angle, and
   g) analyzing said scanned text as rotated.

2. The method as defined by claim 1 wherein step d) includes
   rearranging the measurement vector such that P snapshot vectors of size M are produced,
   computing a covariance matrix of said snapshots, and
   performing eigendecomposition of said covariance matrix to estimate a number of angles present.

3. The method as defined by claim 1 wherein step e) includes using a least-squares minimization.

4. The method as defined by claim 1 wherein step e) includes projecting images along each detected angle and searching for peaks.

5. A method of document analysis comprising the steps of
   a) scanning text on a printed page of a document,
   b) formulating a parameter estimation text image framework for said printed page as scanned,
   c) performing a constant-$\mu$ propagation on said text image framework to obtain a measurement vector Z,
   d) estimating a skew angle using a cisoidal component of Z corresponding to said skew angle, and
   e) analyzing said scanned text as altered by said skew angle.

* * * * *